United States Patent [19]
Halasz et al.

[11] Patent Number: 5,797,111
[45] Date of Patent: Aug. 18, 1998

[54] FUEL FLOW CONTROLLER

[75] Inventors: Peter Tancred Halasz, Brownsville, Tex.; Harald Snorre Husby, Lakeland, Fla.

[73] Assignee: Breed Automotive Technology, Inc., Lakeland, Fla.

[21] Appl. No.: 855,084

[22] Filed: May 13, 1997

Related U.S. Application Data

[63] Continuation-in-part of Ser. No. 671,130, Jun. 24, 1996.

[51] Int. Cl.[6] .................. F02D 41/00; F02M 23/00; F02M 25/00
[52] U.S. Cl. .................................................. 701/103
[58] Field of Search ............... 701/103; 123/198 DB, 123/198 D, 630; 307/9.1; 364/431.5

[56] References Cited

U.S. PATENT DOCUMENTS

| | | | |
|---|---|---|---|
| 3,883,084 | 5/1975 | Henderson et al. | 180/282 |
| 3,994,357 | 11/1976 | Smitley | 180/282 |
| 4,319,550 | 3/1982 | Ishii et al. | 123/198 DB |
| 4,549,277 | 10/1985 | Brunson et al. | 364/569 |
| 4,679,808 | 7/1987 | Ito et al. | 180/408 |
| 4,693,493 | 9/1987 | Ikemoto et al. | 280/707 |
| 4,712,807 | 12/1987 | Kurosawa | 280/707 |
| 4,784,237 | 11/1988 | Condne et al. | 180/268 |
| 4,803,627 | 2/1989 | Yasuike et al. | 364/424.05 |
| 4,807,128 | 2/1989 | Ikemoto et al. | 364/424.05 |
| 4,897,776 | 1/1990 | Urababa et al. | 364/424.04 |
| 5,033,428 | 7/1991 | Sasaki | 123/198 D |
| 5,094,478 | 3/1992 | Pfanzeder et al. | 280/756 |
| 5,102,162 | 4/1992 | Okuda et al. | 280/707 |
| 5,127,667 | 7/1992 | Okuda et al. | 280/707 |
| 5,150,917 | 9/1992 | Kawabata | 364/424.04 |
| 5,152,265 | 10/1992 | Hummel et al. | 123/198 DB |
| 5,161,816 | 11/1992 | Okuda et al. | 280/707 |
| 5,261,506 | 11/1993 | Jost | 180/282 |
| 5,328,256 | 7/1994 | Ohta et al. | 303/146 |
| 5,441,026 | 8/1995 | Akimoto | 123/198 D |
| 5,446,658 | 8/1995 | Pastor et al. | 364/423.09 |
| 5,458,396 | 10/1995 | Rost | 297/216.12 |
| 5,471,388 | 11/1995 | Zomotor et al. | 364/424.05 |
| 5,481,139 | 1/1996 | Lucas | 307/9.1 |
| 5,492,368 | 2/1996 | Pywell et al. | 280/806 |
| 5,510,986 | 4/1996 | Williams | 364/424.05 |
| 5,510,988 | 4/1996 | Majeed et al. | 364/424.05 |
| 5,610,575 | 3/1997 | Gioutsos | 340/429 |

FOREIGN PATENT DOCUMENTS

| | | |
|---|---|---|
| 398307A | 5/1990 | European Pat. Off. |
| 2292126 | 2/1996 | United Kingdom |
| 95/08457A | 3/1995 | WIPO |

OTHER PUBLICATIONS

U.S. Patent Application Serial No. 08/673,760 filed Jun. 24, 1996 by Halasz et al. for Control Device to Selectively Actuate at Least One Vehicular Safety Device.

*Primary Examiner*—Raymond A. Nelli
*Attorney, Agent, or Firm*—L. R. Drayer

[57] ABSTRACT

A control device actuates at least one fuel flow control device in the event of a vehicle crash or roll over. The control device has a sensor stage to sense a plurality of parameters including acceleration, pitch angle and roll angle of a vehicle. A corresponding plurality of signals are generated representing each such parameter. The control device has a control stage including circuitry to receive the plurality of signals and to generate a control signal corresponding to each such parameter when the corresponding signal exceeds a predetermined value. A safety device actuator has circuitry to receive the control signals and to generate a corresponding actuator signal to actuate a fuel flow control device.

11 Claims, 3 Drawing Sheets

FUEL FLOW CONTROLLER

This is a continuation-in-part of application Ser. No. 08/671,130 filed Jun. 24, 1996.

This invention relates to a control device to electively actuate at least one fuel flow control device when a sudden change in acceleration, pitch angle or roll angle of a vehicle is detected.

Accelerometers that measure pitch and roll angles along a predetermined axis and produce signals representative of such measurements are well known in the art. Likewise, filtering, digitizing, formulating and analyzing the accelerometer signals to assess whether certain action should be taken is also known. These concepts have been disclosed in numerous patents in the fields of motor vehicle suspension control, motor vehicle body roll compensation, roll-over bar activation systems and seat belt pretensioner systems.

Studies indicate that injuries in motor vehicle accidents, especially at high speeds, can be substantially reduced by the use of occupant restraint systems. These systems commonly include a seat belt pretensioner assembly which is operable to move a seat belt assembly through a pretensioning stroke to remove slack from the seat belt during abrupt changes in an automobile's position. When the motor vehicle is subjected to a sudden change in position relative to the driving surface, caused either by a roll-over or pitch-over, the seat belt pretensioner is actuated to tightly restrain a vehcile occupant to minimize movement and prevent contact between the occupant and the automobile interior such as the roof, windshield, steering wheel, and side doors. Since an important element of such protective systems is the sensing system which activates the seat belt pretensioner mechanism, the position of the motor vehicle relative to the driving surface must be carefully and precisely monitored so that the seat belt pretensioner is activated rapidly and reliably before the occupants suffer substantial injury.

Other occupant safety devices employed in motor vehicles to be actuated upon the prediction of a roll-over or a pitch-over may include airbags, an automatic roll-over bar and automatic door locks.

U.S. Pat. No. 5,102,162 teaches a suspension control apparatus that maintains a level attitude during cornering and turning by computing and map-retrieving from output signals of a vehicle speed sensor and output signals of a yaw angular velocity sensor for detecting angular velocity about a yaw axis of the vehicle.

U.S. Pat. No. 5,471,388 discloses a method and apparatus for preventing vehicle handling instabilities, in which a vehicle yaw angular velocity required value is formed from measured quantities (vehicle velocity, steering wheel angle). The vehicle yaw angular velocity actual value is determined from at least one sensor signal, the difference between the yaw angular velocity required value and the yaw angular velocity actual value from the yaw angular velocity required value, and the handling situation or the vehicle yaw behavior to be detected is determined from this difference.

U.S. Pat. No. 4,549,277 relates to a multiple sensor inclination measuring system which includes a plurality of single and dual axis inclination sensors, each sensor including a bridge circuit for generating a signal or pair of signals. Each signal has a voltage which is proportional to the degree of inclination of the sensor. An analog-to-digital convertor converts the signal to a digital word having a binary value representative of the tilt of the sensor.

U.S. Pat. No. 4,679,808 describes a system for estimating the state of a controlled vehicle's motion which has a steering wheel angle sensor, a vehicle speed sensor, a sensor for sensing a first motion variable such as a yaw rate, a sensor for sensing a second motion variable such as a yaw acceleration, and a processing unit such as a microcomputer.

U.S. Pat. No. 5,161,816 teaches a suspension control apparatus for a vehicle having at least one shock absorber with a controllable damping force. The suspension control apparatus includes a roll angular velocity sensor for detecting angular velocity about a roll axis of the vehicle, and control means for determining a bumpy road driving state of the vehicle when an accumulation time exceeds a predetermined accumulation time.

U.S. Pat. No. 4,712,807 discloses a vehicle which includes: an actuator for each wheel, each of which supports the body from one of the wheels and is controllable to provide a variable force between the body and the wheel; a sensor for detecting acceleration of the body and for producing a signal representative thereof; a sensor for each wheel for detecting load acting between the body and the wheel and for producing a signal representative thereof; and a controller for inputting the signals representative of the acceleration of the body and the load on each wheel, for calculating fluctuations in load acting between the wheels and the body, for controlling the actuators to increase or decrease forces provided thereby between the body and the wheels, and for operating by feedback action by comparing the actual fluctuation in the force between the respective wheel and the body as sensed by the load sensor for the wheel with the calculated value therefor, and for bringing the difference between the two values to be zero. Optionally, the acceleration sensor can include a means for sensing roll angle acceleration.

U.S. Pat. No. 5,510,988 relates to a vehicle that has a real time suspension control which requires, as inputs, a set of absolute body modal velocity signals. Accurate estimates of these signals are derived from relative position sensors at the body suspension points.

U.S. Pat. No. 5,510,986 describes a force actuator that is connected between a vehicle body and each vehicle wheel. A position sensor senses displacement between the vehicle body and each vehicle wheel and provides a position signal indicative thereof. An acceleration sensor senses vertical inertial acceleration of the vehicle body relative to ground at each vehicle wheel and provides an acceleration signal indicative of vertical inertial acceleration of the vehicle body at each vehicle wheel.

U.S. Pat. No. 5,127,667 teaches a method wherein a pitching motion of a vehicle during driving is correctly grasped by computing and map retrieving from output signals of a vehicle speed sensor, output signals of a brake switch and output signals of a pitch angular velocity sensor for detecting angular velocity about a pitch axis of the vehicle; and pitching motion of the vehicle is restrained by the adjusting damping force of shock absorbers of the suspension control apparatus.

U.S. Pat. No. 5,328,256 relates to an anti-skid brake control device that has a control circuit to which signals from a steering angle sensor, a yaw detector, and respective wheel velocity sensors of a motor vehicle are inputted, an oil pressure actuator controls of the pressure of the braking fluid for respective wheel cylinders based upon target slip rates and measured slip rates for the respective wheels calculated in the control circuit.

U.S. Pat. No. 4,803,627 discloses a system for vehicle roll control wherein a plurality of actuator assemblies are provided, one corresponding to each one of the vehicle wheels and resiliently suspending it from the vehicle body. Each of these actuator assemblies is adapted to increase or decrease the vehicle height at a location corresponding to its corresponding vehicle wheel as results of control signals being applied to it.

U.S. Pat. No. 4,693,493 relates a system for vehicle roll control wherein a plurality of actuator assemblies are provided, one corresponding to each one of the vehicle wheels and resiliently suspending it from the vehicle body. These actuator assemblies have pressure chambers to increase or decrease the vehicle height at a location corresponding to its corresponding vehicle wheel. A vehicle speed detector senses the road speed of the vehicle, and a steering angle detector senses the steering angle of the vehicle. A control computer controls the working fluid supplying and discharging valves.

U.S. Pat. No. 4,807,128 discloses a system for vehicle roll control wherein one actuator assembly is provided corresponding to each vehicle wheel and resiliently suspends it from the vehicle body. Each of these actuator assemblies is adapted to increase or decrease the vehicle height at its vehicle wheel as a result of a control signal being supplied. Control means are provided corresponding to the actuator assemblies and serve to supply control signals to them. A vehicle speed detecting means senses road speed, a steering angle detecting means senses steering angle, a means senses the rate of change of steering angle, and a means detects the actual roll angle of the vehicle body.

U.S. Pat. No. 5,094,478 teaches a convertible motor vehicle with two roll-over bars which can be swivelled from a lowered inoperative position to a supporting position.

U.S. Pat. No. 5,458,396 discloses a convertible motor vehicle with at least one seat having an extendable roll bar incorporated into an upper portion thereof. Known motion sensors are used to trigger the roll bar and cause a release from its rest position to its operating position.

U.S. Pat. No. 5,492,368 relates to a vehicle seat system for a vehicle including a resilient vehicle seat cushion; a lap restraint; a belt wrench tensionally associated with the lap restraint to tension the lap restraint to pull the seated occupant into the seat cushion; and a sensor to activate the belt wrench when the vehicle undergoes a displacement condition indicative of a vehicle rollover condition.

U.S. Pat. No. 5,261,506 describes a control device for a passenger safety apparatus wherein the safety apparatus is triggered by a sensor arrangement which responds to a longitudinal and/or transverse acceleration of the motor vehicle. It is also independently triggerable by an additional state-of-motion or moving condition sensor which is configured to recognize a near weightless state of the vehicle.

Despite these numerous devices, the need for a fuel flow control device including a sensing mechanism to shut off fuel flow from a fuel tank or the like when a roll-over or pitch-over condition exists is not taught in the known prior art.

SUMMARY OF THE INVENTION

There is provided in accordance with the present invention a control device to deactivate a fuel flow control device in the event of a motor vehicle roll-over or pitch-over movement, and in the event of an impact to the vehicle exceeding a preset threshold velocity or acceleration.

There is also provided in accordance with the present invention logic and a method for predicting roll-overs and pitch-over movements of motor vehicles and for deactivating fuel flow control devices in response to the predictions.

There is also provided in accordance with the present invention logic and a method for analyzing signals produced by accelerometers for sensing vehicular attitude to predict roll or pitch movements in motor vehicles.

There is also provided in accordance with the present invention logic and a method for analyzing signals produced by accelerometers for sensing both the X-axis (pitch and side impacts) and Y-axis (roll and front/rear impacts) in motor vehicles for deactivating fuel flow control devices based on those signals.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
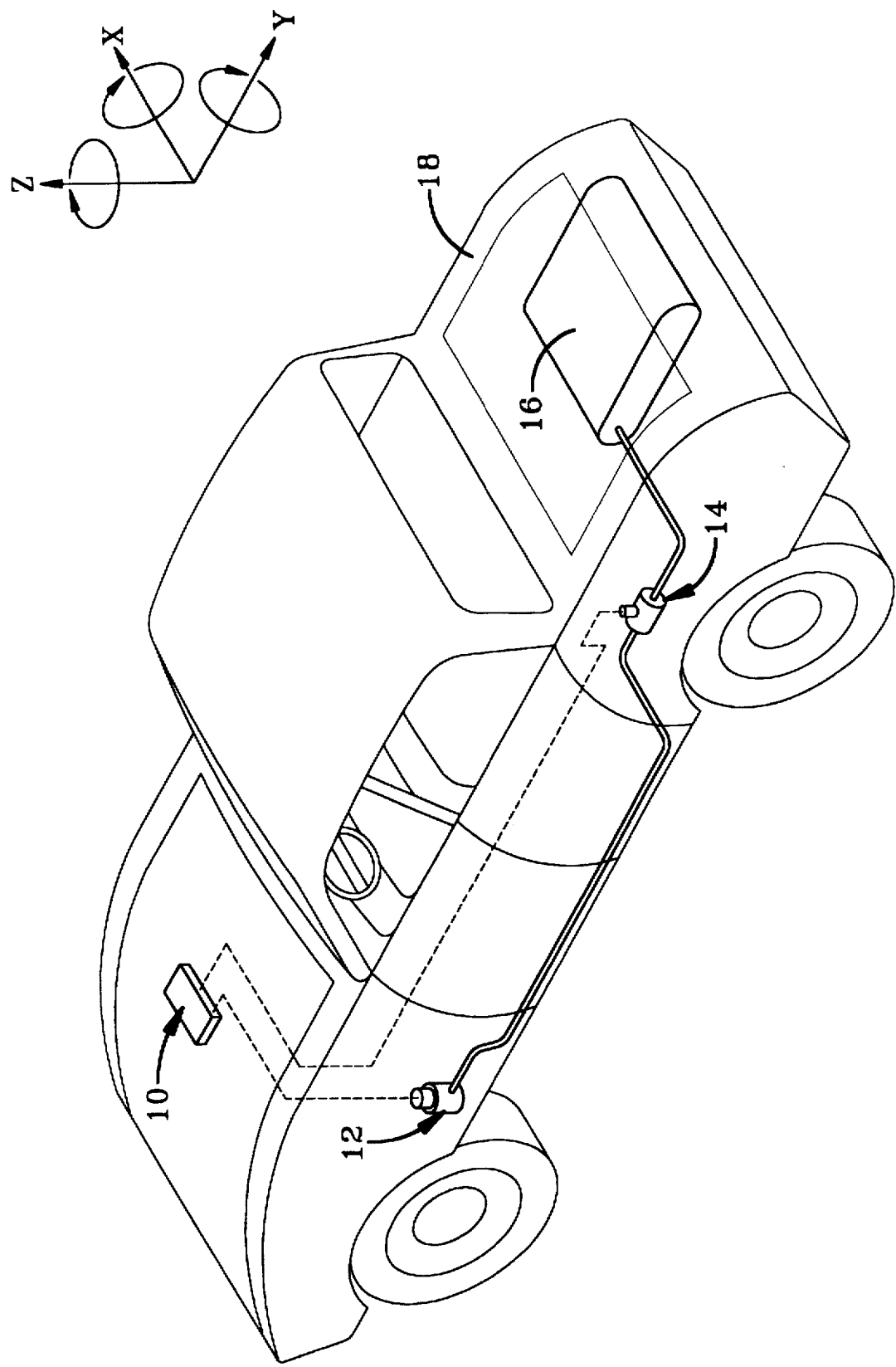
FIG. 1 is a perspective view of a vehicle with the control device of the present invention.

As shown in FIG. 1, the present invention relates to a control device 10 to selectively actuate a fluid flow control device such as a fuel pump cut-off switch or fuel line control valve to control fuel flow from the fuel tank 16 of a vehicle 18.

Figure 2:
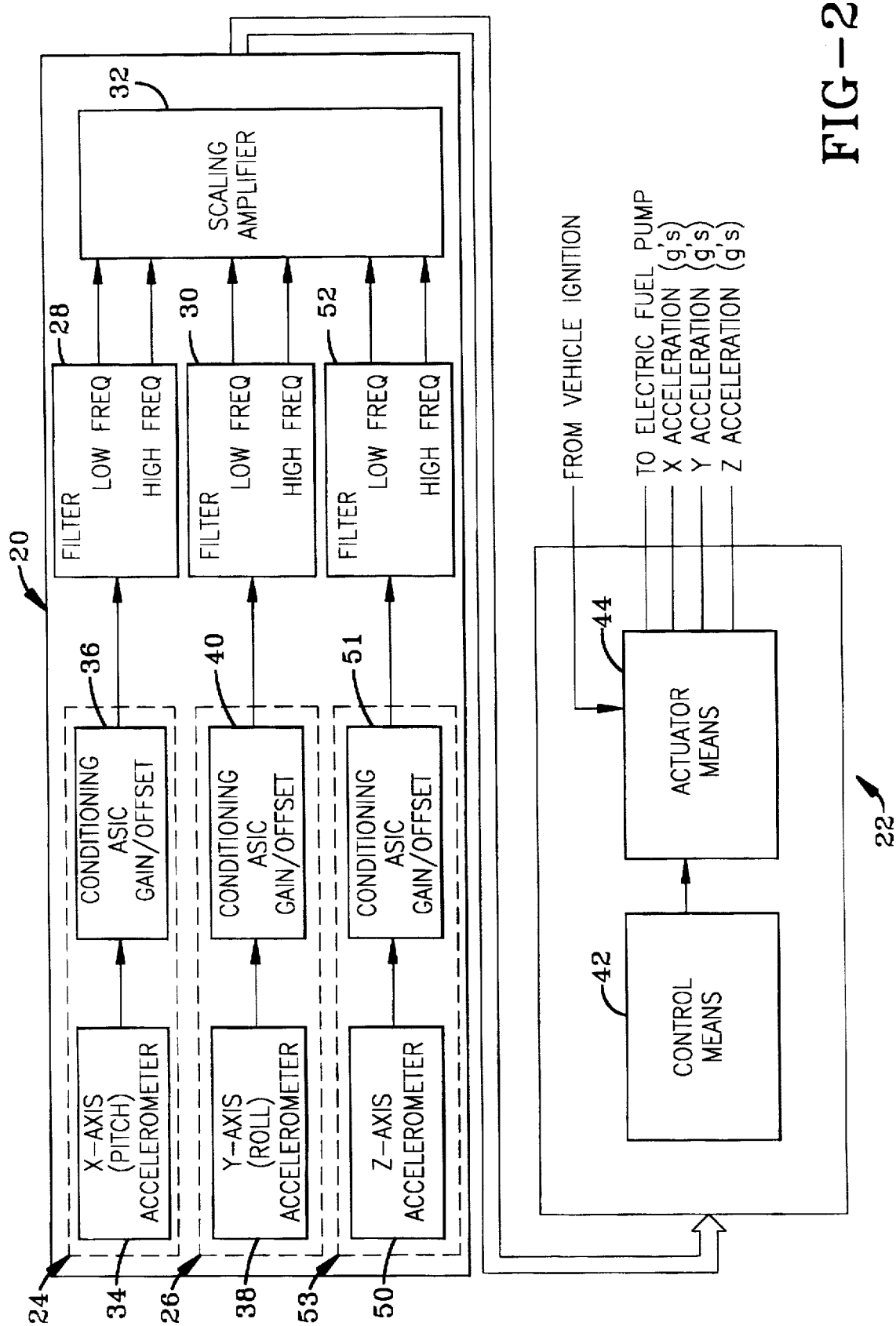
FIG. 2 is a block diagram of the control device of the present invention.

As shown in FIG. 2, the control device 10 comprises a sensor means 20 to sense a plurality of parameters including acceleration, pitch and roll angles of the vehicle 18 as defined hereinafter and to generate a corresponding plurality of signals representing each such parameter and a control means 22 comprising a control signal generator means including control logic circuitry to receive the plurality of signals and to generate a control signal corresponding to each such parameter when the corresponding signal exceeds a predetermined value and a safety device actuator signal generator means including actuator logic circuitry to receive the control signals and to generate a corresponding actuator signal to actuate the corresponding fuel flow control device.

For convention, an angle of inclination is defined as the rotation of an object with respect to the Earth's surface. Two angles, roll and pitch, completely describe the inclination of an object such as the vehicle 18 with respect to the Earth's gravitational field. With reference to the control device 10 of the present invention, three single axis micromachined capacitive type accelerometers may be used for sensing these angles.

As shown in FIG. 1, the pitch angle or inclination of the longitudinal center line of the vehicle 18 relative to the roadway is measured about the X-axis and the roll angle or inclination of the transverse center line of the vehicle 18 is measured about the Y-axis. As described more fully hereinafter, the control device 10 measures pitch and roll angles of inclination.

As previously described, the control device 10 comprises a sensing means 20 and a control means 22. As shown in FIG. 2, the sensing means 20 comprises: first 24, second 26 and third 53 sensing elements; corresponding first 28, second 30, and third 52 filters; and a scaling amplifier 32. The first sensing element 24 comprises an X-axis accelerometer 34 and a corresponding conditioning Application Specific Integrated Circuit (ASIC) 36. The second sensing element 26 comprises a Y-axis accelerometer 38 and a corresponding conditioning ASIC 40. The third sensing element 53 comprises a Z-axis accelerometer 50 and a corresponding conditioning ASIC 51. The X-axis accelerometer 34, the Y-axis accelerometer 38 and the axis accelerometer 50 generate analog signals corresponding to the angular inclination or disposition of the vehicle 18 relative to the roadway. The conditioning ASICs 36, 40 and 51 calibrate the corresponding analog signals from the X-axis accelerometer 34, the Y-axis accelerometer 38 and the Z-axis accelerometer 50 in a ratio typically of 1 G to 1 volt. Of course, a single package and triaxial accelerometer is equally suitable. The first, second and third filters 28, 30 and 52 filter the corresponding analog signals from the first, second and third sensing elements 24, 26 and 53 respectively into a first, or low frequency, band width such as from about 0 Hz to about 40 Hz corresponding to, or representing, the angles of inclination to the X-axis and Y-axis relative to the roadway as indicators of the pitch and roll condition of the vehicle respectively. The analog signals from the sensors are also filtered into a second, or high frequency, band width such as from about 0 Hz to about 2000 Hz corresponding to, or representing, acceleration indicative of an impact due to a collision. The scaling amplifier 32 scales and amplifies the low and high frequency analog signals from both the first, second and third filter 28, 30 and 52 received from the sensing means 20 corresponding to the pitch and roll angles of inclination about the X-axis and Y-axis respectively, and corresponding to impact severity to the vehicle.

As shown in FIG. 2, the control means 22 comprises a control signal generator means 42 including logic means to generate a pitch angle and a roll angle signal corresponding to the angle of inclination of the vehicle relative to the roadway about the X-axis and Y-axis respectively. The control signal generator means 42 further includes logic circuitry to generate a control signal when either the pitch angle or the roll angle exceeds a predetermined value indicative of a pitch-over or roll-over condition by comparing the pitch angle or roll angle to predetermined values of pitch angle and roll angle. The control signal generator means further comprises logic means to generate a control signal based on data contained in the acceleration signals such as G forces, frequency, velocity change, rates of acceleration and velocity changes, or other significant parameters contained in the signals. The control signal generator generally will contain a microprocessor containing a predetermined program often referred to as an Algorithm. The microprocessor issues commands to the actuator means to control the flow of fuel from the full tank.

The actuator signal generator means 44 includes logic means to generate an actuator signal to actuate the fuel pump cut-off switch 12, or fuel flow control valve 14, in response to the control signal from the control signal generator means 42. The fuel pump cut-off switch 12, or fuel flow control valve 14, functions to stop the flow of fuel from the gas tank.

The control signal generator means 42 includes logic means to generate the first control signal when the G force sensed by the sensor means 20 exceeds a predetermined value such as about 3 G's for a predetermined time such as about 20 milliseconds (MS). Most preferably the control device can predict an imminent roll or pitch over by comparing and evaluating the signals from the X-axis accelerometer, Y-axis accelerometer and Z-axis accelerometer will predict a rollover or pitch-over based on angles of inclination and rate of change of said angles, and based on such prediction will actuate a fuel flow contol device.

Figure 3:
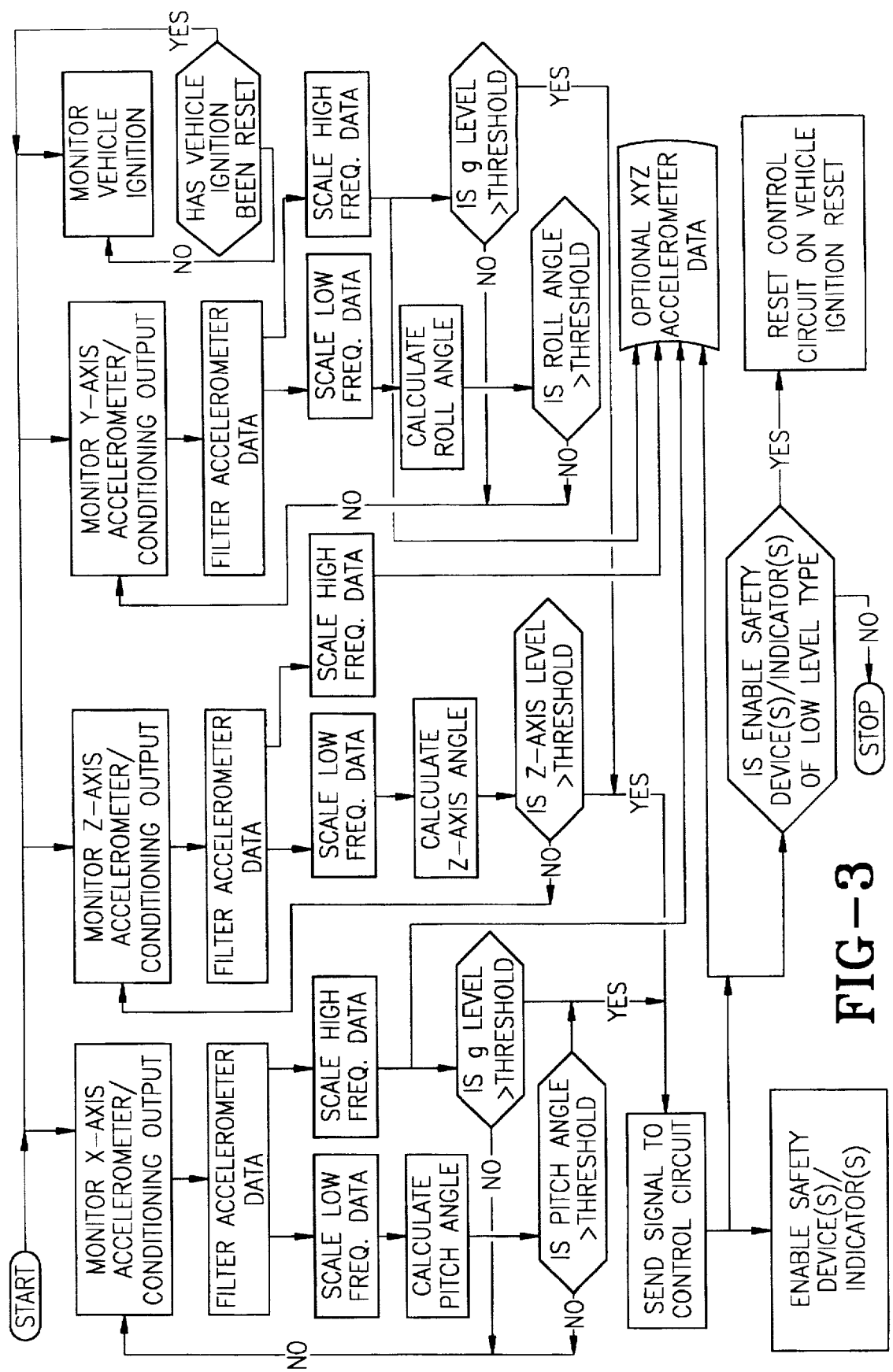
FIG. 3 is a flow chart depicting the operation of the control device of the present invention.

As shown in FIGS. 2 and 3, the values of the G-forces measured along the X-axis, Y-axis and Z-axis as well as the pitch and roll angles along the X-axis and Y-axis may be fed to an optional output data and/or event recording device (not shown). The control device 10 may further include a system reset means to clear faults and reset the control device 10 upon ignition switch activation.

Although the invention has been described in its preferred embodiment, it is understood that the present disclosure of the preferred embodiment may be changed in details of construction and the combination and arrangement of elements may be departed from without diminishing the scope of the invention as hereinafter claimed.

We claim:

1. A control device to selectively actuate a fuel flow control device comprising:
   (a) a sensor means to sense the pitch angle and roll angle of a vehicle and to generate a corresponding signal representing each such angle;
   (b) a control means including circuitry to receive said signals and to generate a control signal when either said signal exceeds a predetermined value; and
   (c) an actuator means including circuitry to receive said control signal and to generate an actuator signal in response thereto to actuate the fuel flow control device to prevent the flow of fuel from the fuel tank.

2. A control device to selectively actuate a fuel flow control device according to claim 1 wherein the sensor means comprises a first sensing element having an X-axis accelerometer, a second sensing element having a Y-axis accelerometer, and a third sensing element having a Z-axis accelerometer; the X-axis, Y-axis and Z-axis accelerometers generate analog signals corresponding to the angular inclination or disposition of the vehicle relative to the roadway; the pitch angle or inclination of the longitudinal center line of the vehicle relative to the roadway is measured about a X-axis and, the roll angle or inclination of the transverse center line of the vehicle relative to the roadway is measured about a Y-axis; the control device measures pitch and roll angles of inclination.

3. A control device to selectively actuate a fuel flow control device according to claim 2 wherein the sensor means further comprises first, second and third filters to selectively filter the corresponding analog signals from the first, second and third sensing elements into a first frequency band width corresponding to the angles of inclination to the X-axis and the Y-axis relative to the roadway indicative of the pitch and roll condition of the vehicle and a second band width corresponding to an acceleration indicative of an impact.

4. A control device to selectively actuate a fuel flow control device according to claim 3 wherein the first band width is from about 0 Hz to about 40 Hz and the second band width is from about 0 Hz to about 2000 Hz.

5. A control device to selectively actuate a fuel flow control device according to claim 3 wherein the sensor means further comprises a scaling amplifier.

6. A control device to selectively actuate a fuel flow control device according to claim 1 wherein the control means comprises a control signal generator means having logic means to generate a pitch angle and a roll angle signal corresponding to the angle of inclination of the vehicle relative to the roadway along the X-axis and Y-axis respectively, and an actuator signal generator means.

7. A control device to selectively actuate a fuel flow control device according to claim 6 wherein the control signal generator means further comprises logic circuitry to generate a control signal when either the pitch angle or the roll angle exceeds a predetermined value indicative of a pitch-over or roll-over condition by comparing the pitch angle or roll angle to predetermined values of pitch angle and roll angle.

8. A control device to selectively actuate a fuel flow control device according to claim 7 wherein the control signal generator means further comprises logic means to generate the control signal when the G force sensed by the sensor means exceeds a predetermined value such as about 3 G's for a predetermined time.

9. A control device to selectively actuate a fuel flow control device according to claim 7 wherein the control signal generator means further comprises logic means to generate a control signal based on data contained in the acceleration signals such as G forces, frequency, velocity change, rates of acceleration and velocity changes.

10. A control device to selectively actuate a fuel flow control device according to claim 9 which can predict an imminent roll or pitch over by comparing and evaluating the signals from the X-axis accelerometer, Y-axis accelerometer and Z-axis accelerometer will predict a rollover or pitch-over based on angles of inclination and rate of change of said angles, and based on such prediction will actuate a fuel flow contol device.

11. A control device to selectively actuate a fuel flow control device according to claim 1 wherein the control device includes a system reset means to clear faults and reset the control device upon ignition switch activation.

* * * * *